United States Patent
Casale et al.

(10) Patent No.: US 11,946,496 B2
(45) Date of Patent: Apr. 2, 2024

(54) HYDRAULIC CONTROL VALVE WITH VISUAL IDENTIFICATION SYSTEM

(71) Applicant: HydraForce, Inc., Lincolnshire, IL (US)

(72) Inventors: Anthony Casale, Lincolnshire, IL (US); Scott Wickboldt, Vernon Hills, IL (US); Aaron Winslow, Hainesville, IL (US)

(73) Assignee: HydraForce, Inc., Lincolnshire, IL (US)

( * ) Notice: Subject to any disclaimer, the term of this patent is extended or adjusted under 35 U.S.C. 154(b) by 296 days.

(21) Appl. No.: 16/576,413

(22) Filed: Sep. 19, 2019

(65) Prior Publication Data

US 2020/0088222 A1    Mar. 19, 2020

Related U.S. Application Data

(60) Provisional application No. 62/733,413, filed on Sep. 19, 2018.

(51) Int. Cl.
  *F16K 51/00*    (2006.01)
  *F15B 21/00*    (2006.01)
  (Continued)

(52) U.S. Cl.
  CPC ............ *F15B 21/00* (2013.01); *F16K 11/076* (2013.01); *F16K 51/00* (2013.01); *F15B 2013/008* (2013.01); *G05D 1/021* (2013.01)

(58) Field of Classification Search
  CPC .... F15B 21/00; F15B 13/0864; F16K 31/061; F16K 27/003; F16K 27/048; F16K 37/0008
  See application file for complete search history.

(56) References Cited

U.S. PATENT DOCUMENTS 4,151,745 A * 5/1979 Cordy ................. G01F 1/42
                                                          116/200
5,364,067 A * 11/1994 Linkner, Jr. .......... B60T 8/3675
                                                          137/454.2
(Continued)

FOREIGN PATENT DOCUMENTS

DE    20105982 U1    7/2001
EP    2746593 A1    6/2014

OTHER PUBLICATIONS

European Patent Office, International Search Report and the Written Opinion in International Application No. PCT/US2019/051975 (dated Dec. 16, 2019).

*Primary Examiner* — Craig M Schneider
*Assistant Examiner* — Christopher D Ballman
(74) *Attorney, Agent, or Firm* — Leydig, Voit & Mayer, Ltd.

(57) ABSTRACT

A hydraulic control valve can be one type of a variable characteristic (e.g., coil voltage). A visual identification system is provided to permit the visual identification of the specific type of the variable characteristic that the control valve is to assist in the assembly of systems utilizing such control valves. The visual identification system includes first and second indicator bearing first and second indicia, respectively, configured to indicate a first value and a different second value of a variable characteristic, respectively. The first and second indicator members are configured to be separately removably mounted to the control valve via a mechanical connection substantially without adhesive such that the appropriate indicator member can be selected and mounted to the valve depending upon what type of valve it is.

19 Claims, 8 Drawing Sheets

(51) Int. Cl.
*F16K 11/076* (2006.01)
*F15B 13/00* (2006.01)
*G05D 1/00* (2006.01)

(56) References Cited

U.S. PATENT DOCUMENTS

| | | | | |
|---|---|---|---|---|
| 5,681,098 | A * | 10/1997 | Ganzel | B60T 8/365 303/119.2 |
| 5,713,108 | A * | 2/1998 | Solomon | B65D 33/1675 24/30.5 R |
| 5,996,629 | A * | 12/1999 | Sato | F15B 13/0817 137/382 |
| 6,561,597 | B1 * | 5/2003 | Ota | B60T 8/363 303/119.2 |
| 7,131,169 | B2 * | 11/2006 | Folkmar | B65D 33/1675 24/30.5 R |
| 10,807,772 | B2 * | 10/2020 | Ruddell | B65D 33/00 |
| 2001/0007354 | A1 * | 7/2001 | Tokuda | F16K 1/42 251/63.5 |
| 2003/0234050 | A1 | 12/2003 | Misumi | |
| 2005/0022877 | A1 | 2/2005 | Boertje et al. | |
| 2008/0164338 | A1 * | 7/2008 | Burns | B05B 7/2405 239/71 |
| 2011/0146798 | A1 * | 6/2011 | Hutton | F16K 27/003 137/1 |
| 2012/0083804 | A1 * | 4/2012 | Skerven | A61B 17/08 606/142 |
| 2014/0130904 | A1 * | 5/2014 | Glime, III | F16K 37/0008 137/377 |
| 2014/0191452 | A1 * | 7/2014 | Moss | F16F 9/0218 267/119 |
| 2016/0116075 | A1 | 4/2016 | Pippel et al. | |
| 2017/0167629 | A1 * | 6/2017 | Hodge | A44B 17/0023 |

\* cited by examiner

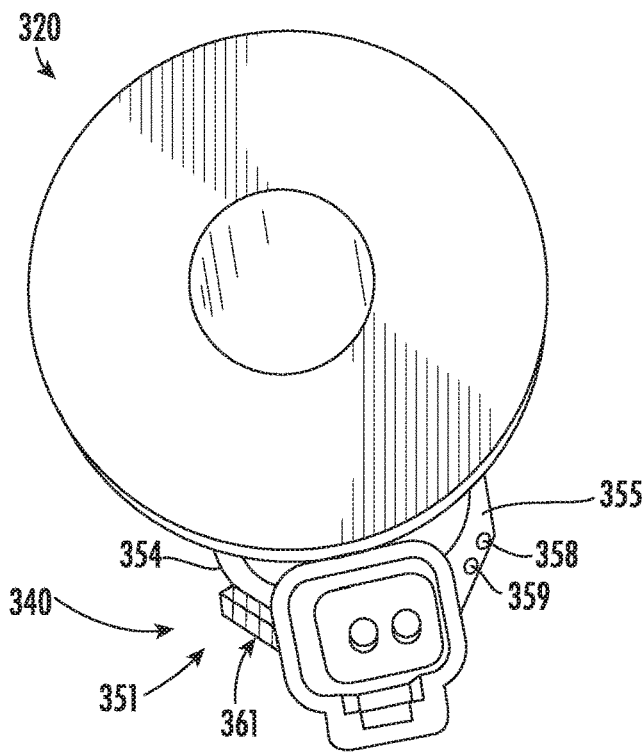
FIG. 9
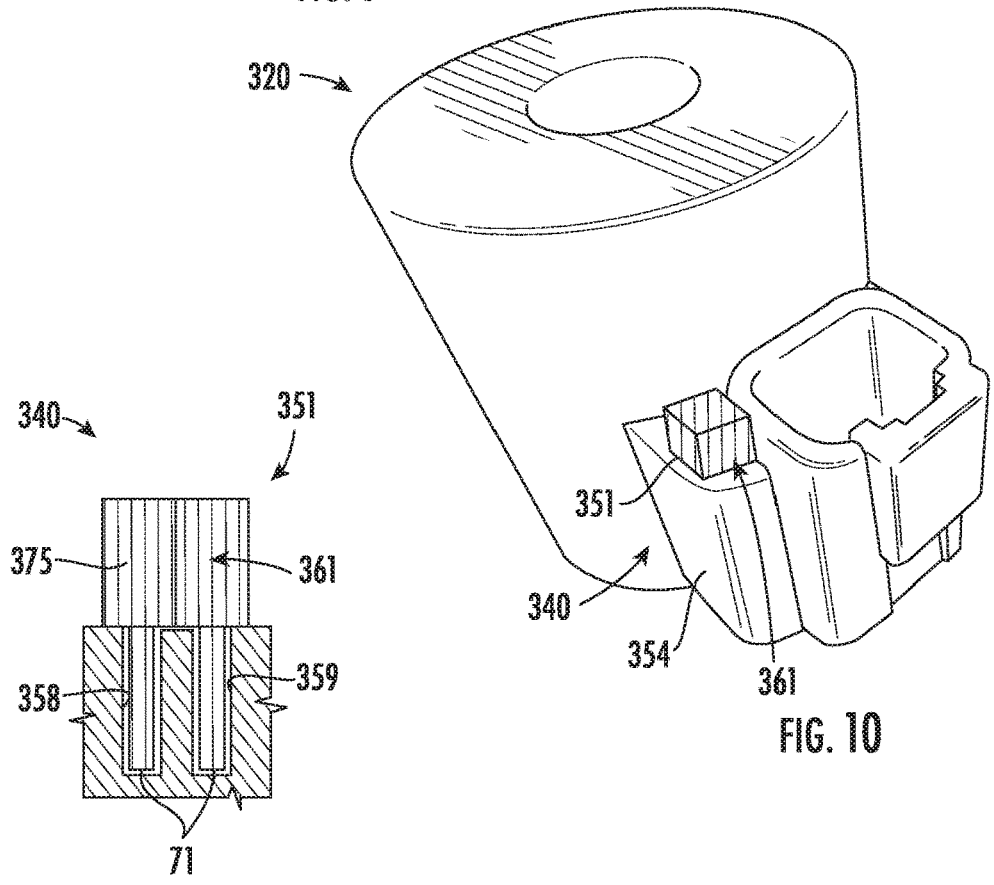
FIG. 10
FIG. 11

HYDRAULIC CONTROL VALVE WITH VISUAL IDENTIFICATION SYSTEM

CROSS-REFERENCE TO RELATED APPLICATIONS

This patent application claims the benefit of priority to U.S. Provisional Patent Application No. 62/733,413, filed Sep. 19, 2018, and entitled, "Hydraulic Control Valve with Visual Identification System," which is incorporated in its entirety herein by this reference.

TECHNICAL FIELD

This patent disclosure relates generally to a hydraulic control valve, and more particularly to an identification system for visually distinguishing between hydraulic control valves.

BACKGROUND

Solenoid-actuated hydraulic control valves typically have a coil of electrically conductive wire surrounding an armature and an end cap or plug. The armature and cap are made of a ferromagnetic material and are coaxially arranged with an air gap between the armature and the cap. A spool or valve member is operatively associated with the armature. When the coil is energized, it produces magnetic flux forces, and, in response, the armature and, thus, the spool are moved through the air gap. In a proportional solenoid-actuated hydraulic control valve, the movement of the spool member is proportional to the input current on the solenoid coil.

An electrical connector is typically mounted to each solenoid-actuated hydraulic control valve and is electrically connected to the coil. A second mating electrical connector, such as one in a wiring harness, for example, is used to facilitate an electrical connection between the valve and another assembly.

In some applications, solenoid-actuated hydraulic control valves with different configurations are secured or mounted to a hydraulic integrated circuit manifold, a cast iron control valve body, a pump, a motor, a cylinder, or other structure. Since many of those differently configured valves are identical or similar in appearance, it can be time consuming and difficult to connect the valves to the respective mating electrical connector, such as, in a wiring harness. Systems exist that use colors to identify and correlate the electrical connectors of the wiring harness with the various solenoid-actuated hydraulic control valves on the manifold. In one arrangement, colored tape is wrapped around the coil to identify each solenoid-actuated hydraulic control valve. The tape may eventually lose its adhesive characteristic, and become detached from the particular hydraulic control valve to which it had been affixed.

There is a continued need in the art to provide additional solutions to enhance the ability to identify a particular hydraulic control valve within an assembly. For example, there is a continued need for a robust visual identification system for hydraulic control valves. Additionally, there is a continued need for an identification system that provides different identification indicia respectively indicative of different values of a variable characteristic (or characteristics) of each configuration type of hydraulic control valve.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a hydraulic control valve with a visual identification system that readily permits the visual identification of a specific one of plurality of different possible values of a variable characteristic of a type of hydraulic control valve to assist in the assembly of systems utilizing such control valves. The present disclosure, in another aspect, is directed to embodiments of a visual identification system for use with a plurality of different possible values of a variable characteristic of a type of hydraulic control valve.

In one embodiment, a hydraulic control valve includes a control valve cartridge assembly, an electro-magnetic actuator, and a visual identification system. The control valve cartridge assembly includes a movable member that is movable over a range of travel between a first flow position and a second flow position. The electro-magnetic actuator is mounted to the control valve cartridge assembly and is operatively associated with the movable member of the control valve cartridge assembly to selectively move the movable member from the first flow position to the second flow position. At least one of the control valve cartridge assembly and the electro-magnetic actuator includes a visual identifier mounting member.

The visual identification system includes a first indicator member and a second indicator member. The first indicator member has an external surface bearing a first indicia, and the second indicator member has an external surface bearing a second indicia that is different from the first indicia. The first and second indicator members are each configured to be separately removably mounted to the visual identifier mounting member via a mechanical connection substantially without adhesive. The first indicia and the second indicia comprise a predetermined graphical code configured to indicate a first value and a second value of a variable characteristic, respectively. The first value is different from the second value.

In another embodiment, a hydraulic control valve includes a control valve cartridge assembly, an electro-magnetic actuator, and a visual identification system. The control valve cartridge assembly includes a movable member movable over a range of travel between a first flow position and a second flow position. The electro-magnetic actuator is mounted to the control valve cartridge assembly and is operatively associated with the movable member of the control valve cartridge assembly to selectively move the movable member from the first flow position to the second flow position. At least one of the control valve cartridge assembly and the electro-magnetic actuator includes a visual identifier mounting member that defines a cavity.

The visual identification system includes a first indicator member and a second indicator member. The first indicator member has an external surface bearing a first color, and the second indicator member has an external surface bearing a second color that is different from the first color. The first and second indicator members are each configured to be separately removably mounted in the cavity of the visual identifier mounting member. The first indicia and the second indicia comprise a predetermined color code configured to indicate a first value and a second value of a variable characteristic, respectively. The first value is different from the second value.

Further and alternative aspects and features of the disclosed principles will be appreciated from the following detailed description and the accompanying drawings. As will be appreciated, the systems and techniques for control valves and for visual identification systems for control valves that are disclosed herein are capable of being carried out and used in other and different embodiments, and capable of being modified in various respects. Accordingly, it is to be understood that the following detailed description is exemplary and explanatory only and does not restrict the scope of the principles disclosed herein.

BRIEF DESCRIPTION OF THE DRAWINGS

FIG. 9 is a top perspective view of a portion of still another embodiment of a solenoid coil and of another embodiment of a visual identification system for use in a hydraulic control valve constructed in accordance with principles of the present disclosure.

FIG. 10 is a side perspective view of the portion of the solenoid coil and the visual identification system of FIG. 9.

FIG. 11 is a side elevational view of an indicator member in the form of an identification pin of the identification system of FIG. 9, the identification pin comprising a pair of pegs.

It should be understood that the drawings are not necessarily to scale and that the disclosed embodiments are illustrated diagrammatically and in partial views. In certain instances, details which are not necessary for an understanding of this disclosure or which render other details difficult to perceive have been omitted. It should be understood that this disclosure is not limited to the particular embodiments illustrated herein.

DETAILED DESCRIPTION OF EXEMPLARY EMBODIMENTS

The present disclosure provides various embodiments of a hydraulic control valve having a visual identification system configured to distinguish the particularly-configured valve that is one value (or type) of a given variable characteristic (which can relate to its configuration, operation, and/or functionality, for example) between valves that are similar or the same in appearance but being of a different value (or type) of the variable characteristic. Embodiments of hydraulic control valves constructed in accordance with principles of the disclosure include a visual identification system configured to provide a means for distinguishing between differently configured valves that are similar or identical in appearance via predetermined coded indicia. In an aspect of the disclosure, embodiments of a visual identification system constructed according to principles of the present disclosure provides a customizable, robust identification code structure without requiring substantial inventory of costly components. In embodiments, a visual identification system constructed according to principles of the present disclosure is configured to readily permit the visual identification of the specific values (or types) for a plurality of different characteristics of a particular hydraulic control valve using a corresponding number of sets of indicia.

Figure 1:
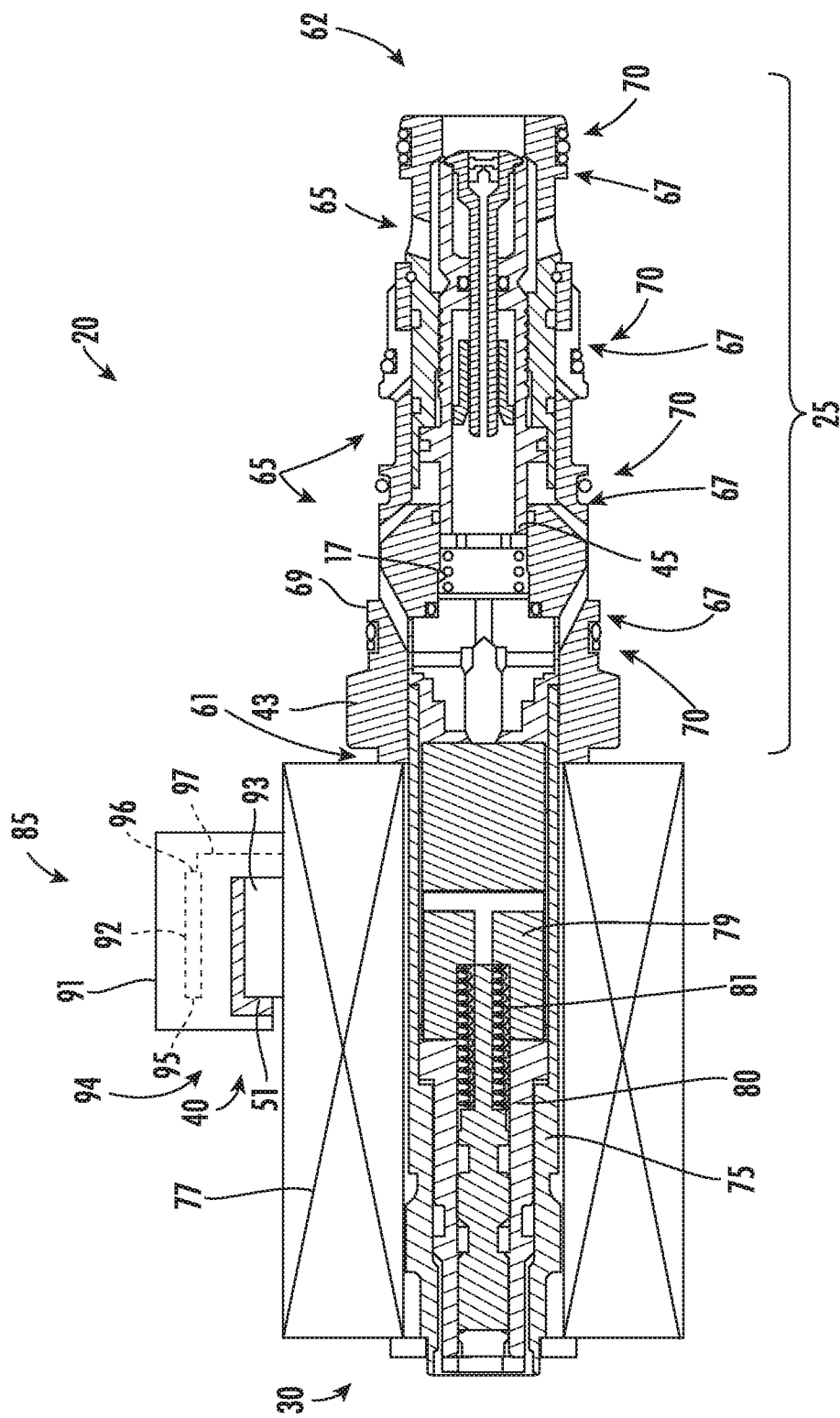
FIG. 1 is a cross-sectional view of an embodiment of a hydraulic control valve having an embodiment of a visual identification system constructed in accordance with principles of the present disclosure.

Turning now to the Figures, there is shown in FIG. 1 a cross-sectional view of an embodiment of a hydraulic control valve 20 constructed in accordance with principles of the disclosure. In the illustrated embodiment of FIG. 1, the hydraulic control valve 20 is configured in the form of a proportional motion control valve.

The hydraulic control valve 20 includes a control valve cartridge assembly 25, an electro-magnetic actuator 30, and a visual identification system 40. The control valve cartridge assembly 25 includes a cage 43 and a movable member in the form of a spool 45 that is slidably disposed within the cage 43. The electro-magnetic actuator 30 is mounted to the control valve cartridge assembly 25 and is operatively associated with the movable member 45 of the control valve cartridge assembly 25 to selectively move the movable member 45 from a first flow position to a second flow position.

Figure 3:
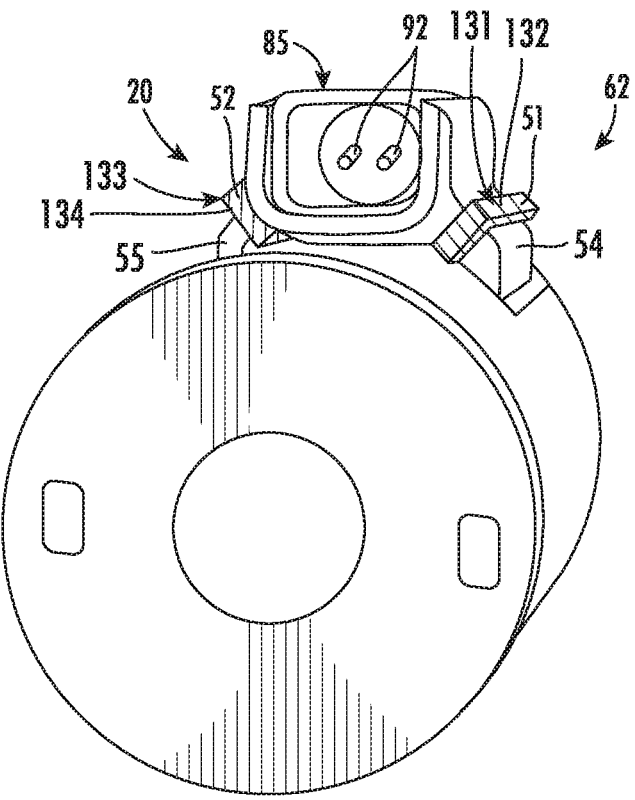
FIG. 3 is top perspective view of a portion of a solenoid coil and the visual identification system of the hydraulic control valve of FIG. 1.
Figure 4:
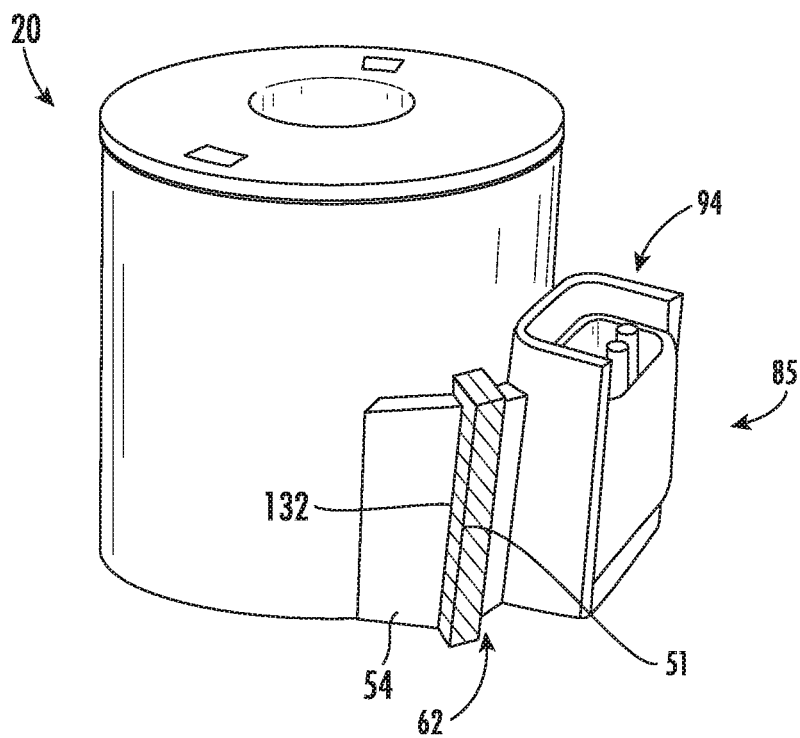
FIG. 4 is a side perspective view of the portion of the solenoid coil and the visual identification system of FIG. 3.
Figure 5:
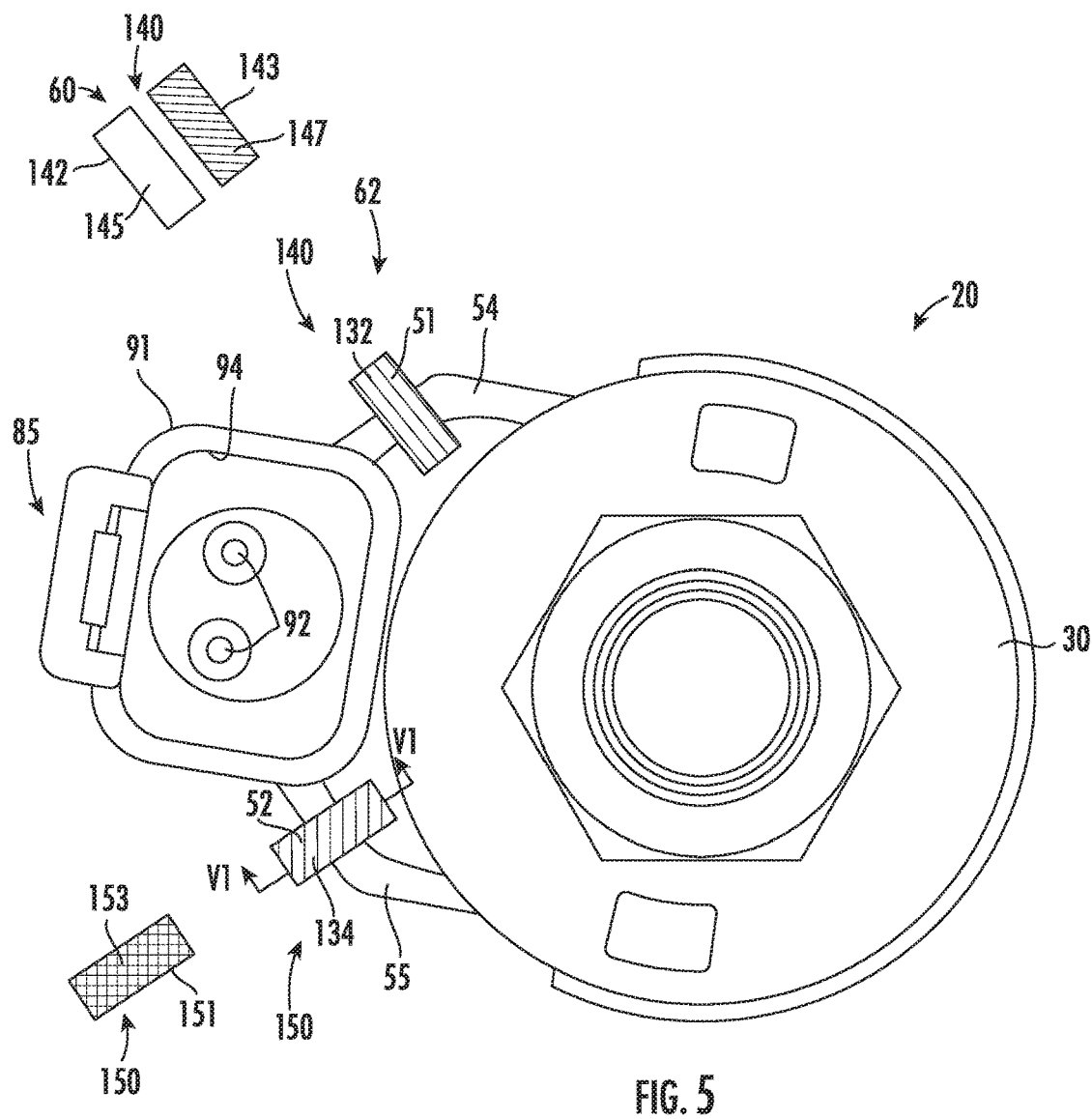
FIG. 5 is a top plan view of the portion of the solenoid coil and the visual identification system of FIG. 3.

The visual identification system 40 includes a first indicator member 51 and a second indicator member 52 (see also, FIG. 3). In embodiments, at least one of the control valve cartridge assembly and the electro-magnetic actuator includes a visual identifier mounting member 54. The visual identifier mounting member 54 is configured to support one of the indicator members. Referring to FIG. 5, the illustrated control valve 10 includes two visual identifier mounting members 54, 55 that are each configured to support a respective one of the first and second indicator members 51, 52.

Referring to FIG. 1, the cage 43 is generally cylindrical and hollow, defining a longitudinal bore 60 that extends along a longitudinal axis of the cage 43 between first and second ends 61, 62 of the cage 43. The cage 43 defines a plurality of ports 65 with one port between each pair of sealing sections 67. In embodiments, the longitudinal bore 60 can be used as a port.

The illustrated outer surface 69 includes a plurality of sealing sections 67 that are in spaced relationship to each other. Each sealing section 67 includes a resilient seal 70, which is illustrated as an o-ring and back-up ring. The resilient seals 70 are configured to provide sealing engagement between the valve 20 and a complementary surface within which the cage 43 is housed to provide fluid isolation between the various ports 65 defined in the cage 43 and internal components of the control valve 20 to help inhibit external leakage. In embodiments, the outer surface 69 of the cage 43 can be adapted to be sealingly engaged with a suitable, mating valve body or manifold 100 (see FIG. 2).

The spool 45 comprises a movable member that is movable over a range of travel between a first flow position (shown in FIG. 1) and a second flow position (shifted to the left from what is shown in FIG. 1). The spool 45 is generally cylindrical and hollow and is slidably disposed within the longitudinal bore 60 defined within the cage 43. In embodiments, the spool 45 can include a plurality of lands, grooves, bores and other components and/or features associated therewith to control the flow of hydraulic fluid between the ports 65 of the cage 43.

The electro-magnetic actuator 30 is mounted to the control valve cartridge assembly 25 and is operatively associated with the movable member 45 of the control valve cartridge assembly 25 to selectively move the movable member 45 from one flow position to another flow position over a range of positions. The electro-magnetic actuator 30 is configured to selectively maintain the position of the movable member (spool) 45 of relative to the cage 43 such that a desired fluid flow condition through the control valve 20 is obtained.

In the illustrated embodiment, the electro-magnetic actuator 30 includes a hollow guide tube or valve body 75, a solenoid coil 77 wound around and mounted to the guide tube 75, a movable plunger or armature 79 slidably disposed within the guide tube 75, and a pole piece 80 anchored within the guide tube 75. The guide tube 75 is connected to the control valve cartridge assembly. The guide tube 75 can be connected to the cage 43 using any suitable technique (e.g., brazing). The armature 79 and the pole piece 80 are preferably fabricated from a magnetic material, such as soft iron, for example. The application of an electrical current to the coil 77 produces a magnetic force between the armature 79 and the pole piece 80 that acts to urge the armature 79 toward the pole piece 80.

When the solenoid coil 77 is electrically energized with current, a magnetic field (or flux) is produced within the guide tube 75 which exerts a longitudinal force on the armature 79. This longitudinal force is proportional to the current applied to the coil 77 and causes the armature 79 to move within the guide tube 75 in the direction of the pole piece 80. A magnetic attractive force between the armature 79 and the pole piece 80 exerts a second longitudinal force on the armature 79 which supplements the longitudinal force provided by the solenoid coil 77.

Movement of the armature 79 causes movement of the spool 45 within the cage 43, and thus can control the flow of hydraulic fluid through the ports 65 of the cage 43 of the control valve 20. A spring 81 can be provided adjacent the armature 79 and configured to provide a biasing force on the spool 45 opposite that provided by the electro-magnetic actuator 30 to bias the spool 45 toward the flow position shown in FIG. 1.

Electrical connections to the electro-magnetic actuator 30 and, in particular, the solenoid coil 77 can be made through an electrical connector 85 mounted to the actuator 30. The electrical connector 85 has an insulative housing 91 in which a plurality of electrically conductive terminals or contacts 92 are mounted. The electrical connector housing 92 can be secured to the housing of the electro-magnetic actuator 30 by arms or connecting members 93. In embodiments, the arms or connecting members 93 can comprise the visual identifier mounting members 54, 55 of the visual identification system 40. The illustrated housing 91 includes a receptacle 94 for receiving a portion of a mating electrical connector (not shown) disposed on another assembly such as a wiring harness (not shown). A mating end 95 of the electrical terminals 92 is disposed within the receptacle 94, and a second end 96 is electrically connected to the coil 77 and other electrical components of the valve 20 through an electrical connection 97.

Although configured as a proportional motion control valve, the control valve 20 can be configured in any desired manner in other embodiments. For example, in embodiments, the control valve 20 can be configured as an on-off valve or as a multi-function valve that provides two or more functions in a single valve. Also, in other embodiments, the components of the cartridge assembly 25 can be different. In a like manner, although configured as a single-coil device, in other embodiments, the control valve can have an electro-magnetic actuator with a different configuration, such as a multi-coil configuration (e.g., a dual coil configuration).

In some applications, a housing or manifold 100 can be configured to receive a plurality of control valves therein. The housing or manifold 100 can define a plurality of bores each configured to receive therein at least a portion of the cartridge assembly 25 of the control valve 20. The housing or manifold 100 can define fluid passageways in communication with one or more of the bores and in different manners. Accordingly, when installing a plurality of control valves having a similar shape and size, but having different values for at least one variable characteristic, an operator typically confirms that the correct control valve 20 is installed in the designated bore of the housing or manifold 100 to achieve proper operation of the overall hydraulic system with which the control valves 20 are associated.

Figure 2:
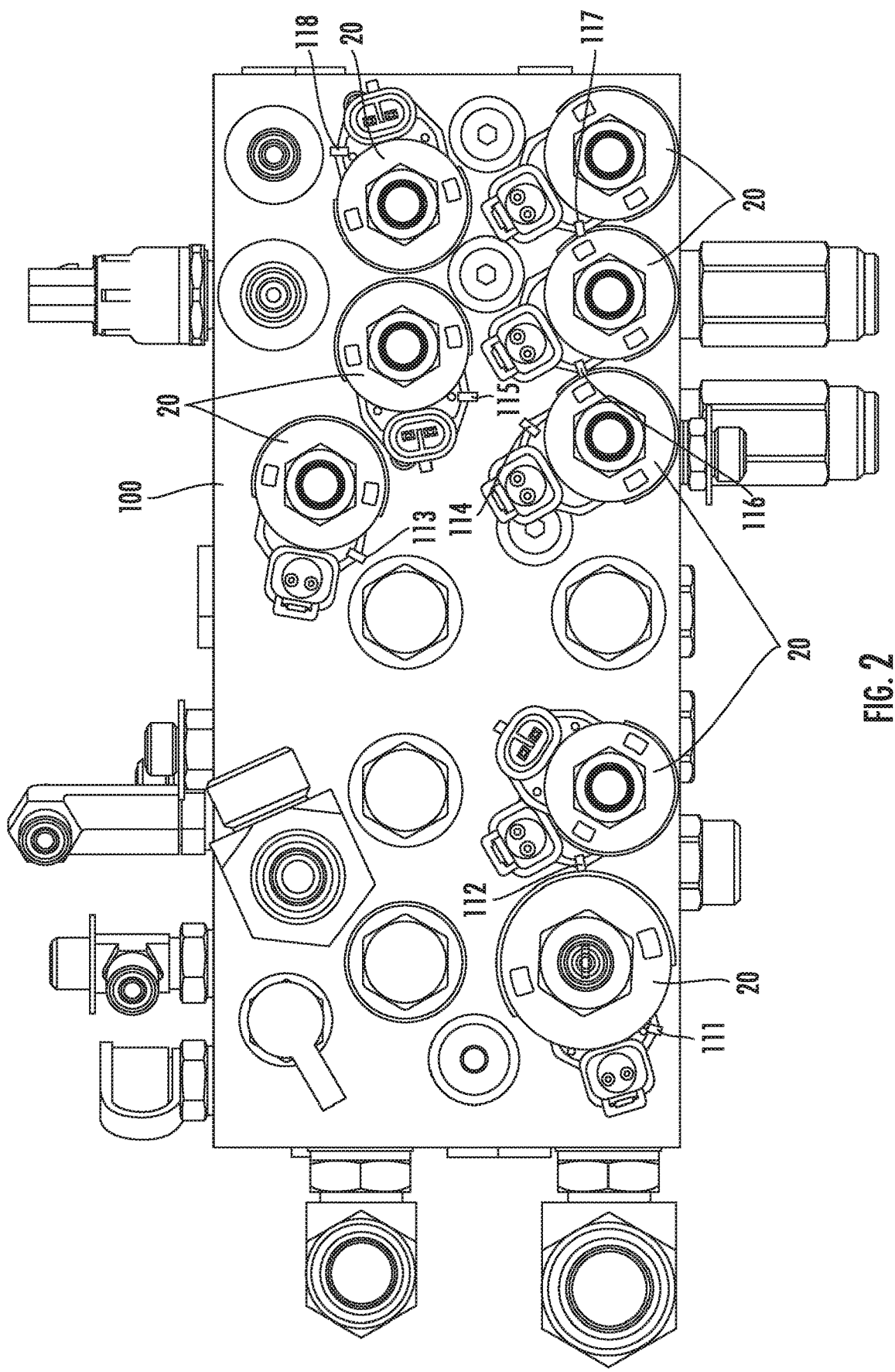
FIG. 2 is a top plan view of a manifold incorporating a plurality of hydraulic control valves in which an embodiment of a visual identification system constructed in accordance with principles of the present disclosure can be used.

Referring to FIG. 2, in order to simplify the assembly of a number of control valves 20 having a similar appearance but being different types of a given variable characteristic (e.g., coil voltage) to the housing or manifold 100 and to provide a visual distinction or indicator between the set of valves 20 that are intended to be mounted in the manifold 100, each valve 20 can include a visual identification system 40 constructed according to principles of the present disclosure and be configured to display at least one of a set of different indicator members 51, 52 corresponding to the particular type of valve that the given valve is according to a predetermined indicia code. In embodiments, the visual identification system 60 can be configured to distinguish between valves 20 that are one value of a given variable characteristic (which can relate to its configuration, operation, and/or functionality, for example).

In embodiments, the visual identification system 60 can include one or more indicator members or indicia 111, 112, 113, 114, 115, 116, 117, 118 associated with each valve 20 in any desired manner so as to distinguish or identify a specific value (or types) of a variable characteristic of the valve 20 from a number of different possible values/types. In embodiments, the variable characteristic comprises one of a coil voltage, a coil type, an electrical connector type, a diode type, and a mounting location.

For example, in embodiments, the visual identification system 60 can be configured to identify that the given valve 20 is one of a number of different coil sizes or coil voltages. In other embodiments, the visual identification system 60 can be configured to identify whether the given valve 20 is a single coil type or a dual-coil type or whether the valve includes an internal diode(s) or not. In embodiments, the visual identification system 60 can also be used to identify which one of a variety of different types of electrical connectors 85 is configured to be matingly received by the particular valve 20. Still further, in some instances, the visual identification system 60 can be used to distinguish between valves 20 of different sizes.

In embodiments, the visual identification system 60 can include a set of mechanically-mountable indicator members 111, 112, 113, 114, 115, 116, 117, 118 having one of a corresponding number of unique indicia (e.g., color) configured to represent one type of valve among a set of different types for a given variable characteristic (e.g., coil voltage). In embodiments, the indicator members 111, 112, 113, 114, 115, 116, 117, 118 are each configured to be interengaged with a visual identifier mounting member 54, 55 of the control valve 20 via a retentive fit. In embodiments, the indicator members 111, 112, 113, 114, 115, 116, 117, 118 are configured to be removably mounted to the valve 20 via a mechanical connection without the use of adhesive to bond the indicator member to the valve 20. In embodiments, the indicator members 111, 112, 113, 114, 115, 116, 117, 118 are configured to be interengaged with the valve 20 via a retentive fit using a suitable mounting structure. In embodiments, the indicator members 111, 112, 113, 114, 115, 116, 117, 118 have the same construction except for the different, unique indicia each one has, and each one of the indicator members 111, 112, 113, 114, 115, 116, 117, 118 can be mounted to at least two different control valves 20 having different values for at least one variable characteristic.

In embodiments, the indicator members 111, 112, 113, 114, 115, 116, 117, 118 can also or alternatively be used to identify the position of each control valve 20 with respect to each port on the manifold 100 and/or a color associated with each mating electrical connector of a wiring harness. For example, in embodiments, the manifold 100 and/or wiring harness can have a unique indicia (e.g. color) associated with each position on the manifold and/or wiring harness. Each valve 20 can have mounted thereto one of the indicator members 111, 112, 113, 114, 115, 116, 117, 118, which are in the form of a clip with a corresponding indicia (e.g. color) that matches the desired position on the manifold 100 and/or wiring harness. In embodiments, the control valves 20 can also have additional identifying indicia as described above, such as with respect to the presence or type of diode and the voltage of the coil 77, such as by mounting a second indicator member (or oven more indicator members) to the control valve 20.

In embodiments, the indicator members 111, 112, 113, 114, 115, 116, 117, 118 can include any suitable indicia that are configured to identify a specific value or type of a variable characteristic of the valve. For example, in embodiments, the indicia can comprise a set of unique colors, shapes, words, graphical images, etc. that correspond to the number of different possible values for the variable characteristic. In embodiments, the indicia can cover the indicator member 111, 112, 113, 114, 115, 116, 117, 118. In other embodiments, the indicia can be located over a portion of the indicator member 111, 112, 113, 114, 115, 116, 117, 118. In embodiments, the indicator members 111, 112, 113, 114, 115, 116, 117, 118 of the visual identification system 40 can have a variety of different configurations.

For example, in embodiments, each indicator member can include suitable indicia in the form of a color that is one of a set of colors configured to identify one of a number of different types for a given characteristic of the valve 20. In embodiments, the visual identification system 60 includes a set of indicator members 111, 112, 113, 114, 115, 116, 117, 118 having indicia in the form of one or more colors with each color or combination of colors operative to identify a unique type of valve 20.

Referring to FIGS. 3-6, the illustrated control valve 20 is shown with two indicator members 51, 52 mounted thereto. The first and second indicator members 51, 52 are each configured to be separately removably mounted to either of the visual identifier mounting members 54, 55 via a mechanical connection substantially without adhesive. In embodiments, the indicator members 51, 52 can be made from any suitable material, such as, a resiliently flexible thermoplastic, for example, that can facilitate the frictional engagement of the indicator members 51, 52 and the portion of the valve 20 to which it they are respectively mounted.

The first indicator member 51 has an external surface 131 bearing a first indicia 132, and the second indicator member 52 has an external surface 133 bearing a second indicia 134 that is different from the first indicia 132. The first indicia 132 and the second indicia comprise a predetermined graphical code configured to indicate a specific value of a first variable characteristic and a specific value of a second variable characteristic, respectively. In the illustrated embodiment, the first indicia 132 comprises the color green covering the external surface 131, and the second indicia 134 comprises the color red covering the external surface 133.

In embodiments, the indicator members 51, 52 bear unique identifying indicia and comprise a selection from a set or sets of indicator members in the form of differently-colored clips that retentively engage corresponding mounting structure found on the valve 20 (e.g., in a retentive snap fit) or otherwise are removably mounted onto a portion of the valve 20 via a mechanical inter-engaging connection without the use of adhesive. In embodiments, the selection of indicator members 51, 52 in the form of differently-colored clips is made from a set that includes at least two clips 51, 52 that are different colors. In yet other embodiments, the selection of colored clips is made from a set that includes, in embodiments, at least three clips 51, 52, 142 that are each a color that is different from the colors of the other clips of the referenced at least three clips; in other embodiments, at least four clips 51, 52, 142, 143 that are each a color that is different from the colors of the other clips of the referenced at least four clips; and in yet other embodiments, at least five clips 51, 52, 142, 143, 151 that are each a color that is different from the colors of the other clips of the referenced at least five clips.

Referring to FIG. 5, in embodiments, the indicator members 51, 52 respectively comprise one of a first set 140 of indicator members 51, 142, 143 configured to indicate a respective set of values or types of a first variable characteristic and a second set 150 of indicator members 52, 151 configured to indicate a respective set of values or types of a second variable characteristic. In embodiments, each indicator member 51, 142, 143; 52, 151 of the first and second sets 140, 150 is configured to be separately removably mounted to at least one of the control valve cartridge assembly and the electro-magnetic actuator 30 via a mechanical connection. In embodiments, each indicator member 51, 142, 143; 52, 151 of the first and second sets 140, 150 is configured to be separately removably mounted to at least one of the control valve cartridge assembly and the electro-magnetic actuator 30 via a mechanical connection substantially without adhesive.

In embodiments, the indicator members 51, 142, 143 of the first set 140 each includes indicia 132, 145, 147 different from the indicia 132, 145, 147 of the other indicator members 51, 142, 143 of the first set 140. In the illustrated embodiment, the indicia 132, 145, 147 of the first set 140 of indicator members 51, 142, 143 comprise the colors green, white, and blue, respectively.

In embodiments, the indicator members 52, 151 of the second set 150 each includes indicia 134, 153 different from the indicia 134, 153 of the other indicator members 52, 151 of the second set 150. In the illustrated embodiment, the indicia 134, 153 of the first set 150 of indicator members 52, 151 comprise the colors red and yellow, respectively. In a similar manner, in embodiments, the indicator members 52, 151 of the second set 150 each includes indicia 134, 153 different from the indicia 132, 145, 147 of all of the indicator members 51, 142, 143 of the first set 140.

The different indicia 132, 145, 147 of the indicator members 51, 142, 143 of the first set 140 can comprise a graphical code respectively signifying specific values of a first variable characteristic, and the different indicia 134, 153 of the indicator members 52, 151 of the second set 150 can comprise a graphical code respectively signifying specific values of a second variable characteristic. For example, in embodiments, the first and second sets 140, 150 of colored indicator members 51, 142, 143; 52, 151 can be used to denote the following different types of variable characteristic control valves:

| Indicator Member | Indicia (Color) | Type/Value of Variable Characteristic |
| --- | --- | --- |
| Indicator Member Set 1 | | |
| 51 | Green (131) | No Diode |
| 142 | White (145) | Standard Diode |
| 143 | Blue (147) | Uni-directional Diode |
| Indicator Member Set 2 | | |
| 52 | Red (134) | 12 V |
| 151 | Yellow (153) | 24 V |

In other embodiments, a different combination of colors (or other indicia) can be used to indicate the respective values/types of the variable characteristic of the valves 20. In yet other embodiments, the combination of colors can be used to denote a different set of types of valves 20. In still other embodiments, different indicia can be used to indicate the respective values of the variable characteristic(s). In embodiments, the visual identification system 40 can be used to indicate which particular values/types of multiple different variable characteristics a particular hydraulic control valve 20 is by using a combination of different sets of indicator members positioned at different locations on the valve 20.

Figure 6:
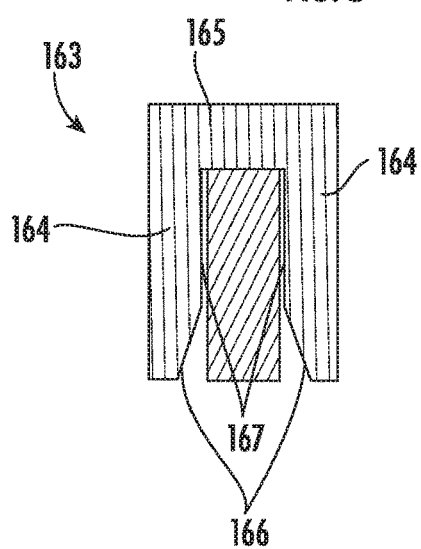
FIG. 6 is a cross-sectional view taken along line VI-VI in FIG. 5 of an indicator member in the form of an identification clip of the identification system of the hydraulic control valve of FIG. 1.

Referring to FIGS. 5 and 6, in embodiments, the first and second sets 140, 150 of indicator members 51, 142, 143; 52, 151 are each constructed in a similar manner and only differ in the indicia 132, 145, 147; 134, 153 each one bears. Referring to FIG. 6, each indicator member comprises a U-shaped clip 163 having a pair of legs 164 in spaced relationship to each other and a bight or connecting member 165 extending between the legs 164. The U-shaped clip 163 can be configured to be interengaged with either of the visual identifier mounting members 54, 55 such that a portion of the visual identifier mounting member 54, 55 is interposed between the pair of legs 164 and frictionally engaged therewith. In the illustrated embodiment, the legs 164 include a tapered distal end portion 166 and a locking portion 167 that snaps onto, or frictionally engages, a portion of the valve 20. For example, in embodiments, the clip 163 can frictionally engage an arm 93 that extends between the electro-magnetic actuator 30 and the housing 91 of the electrical connector 85 such that the clip 163 is removably mounted to the valve 20. In other embodiments, the clip 63 can have a different configuration.

Figure 7:
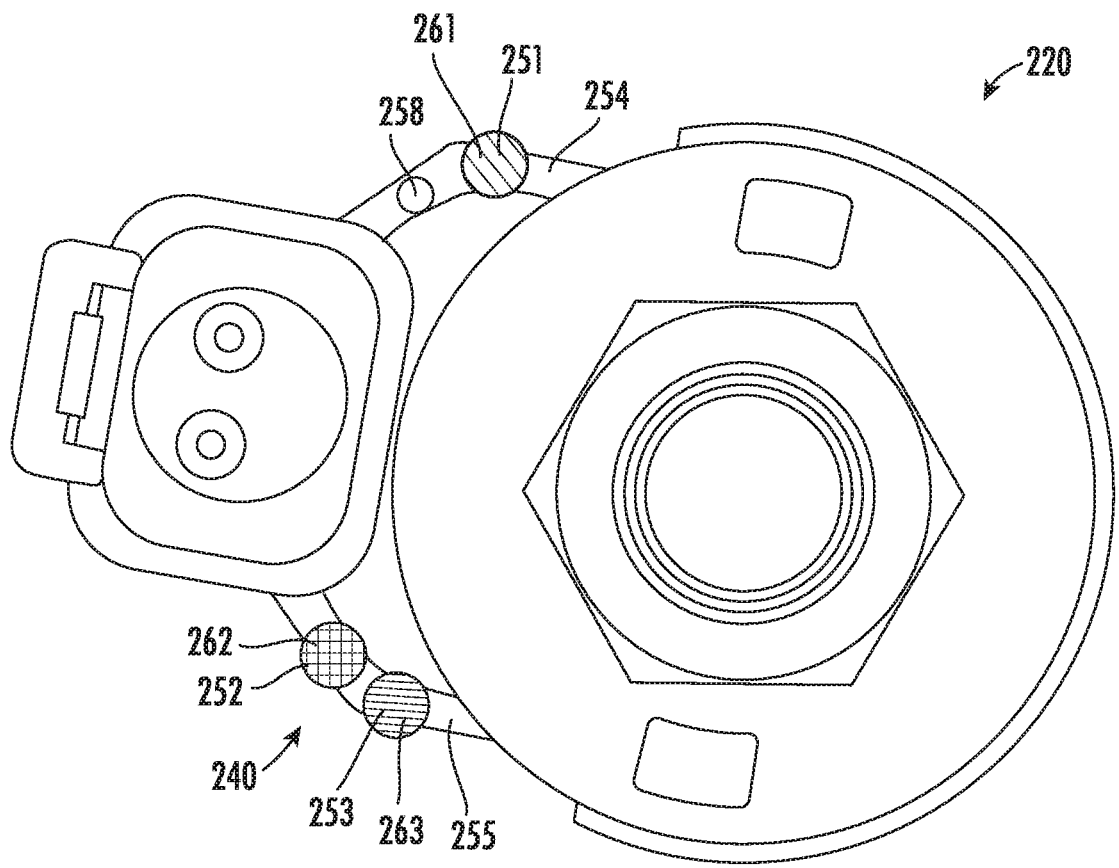
FIG. 7 is a top plan view of a portion of another embodiment of a solenoid coil and of another embodiment of a visual identification system for use in a hydraulic control valve constructed in accordance with principles of the present disclosure.
Figure 8:
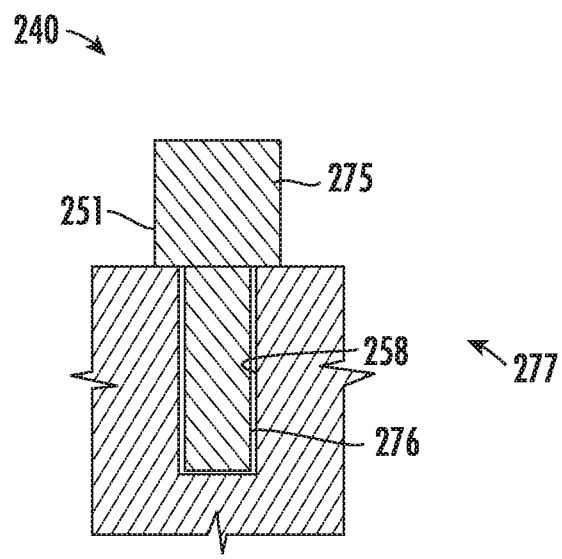
FIG. 8 is a side elevational view of an indicator member in the form of an identification pin of the identification system of the solenoid coil of FIG. 9, the identification pin comprising a single peg.

Referring to FIGS. 7 and 8, another embodiment of a portion of a control valve 220 having a visual identification system 240 constructed according to principles of the present disclosure is shown. The visual identification system 240 includes a plurality of indicator members 251, 252, 253 in the form of a single-legged peg with each indicator member 251, 252, 253 having unique indicia 261, 262, 263 corresponding to a graphical code to indicate a respective specific value (or type) of multiple variable characteristics of the control valve 220. In the illustrated embodiment, the indicia 261, 262, 263 of the indicator members 251, 252, 253 comprise the color green, yellow, and blue, respectively. In other embodiments, different indicia can be used.

In embodiments, each indicator member 251, 252, 253 can be mounted to the control valve 220 by being fitted within any one of a plurality of recesses in the form of bores 258 defined within a pair of visual identifier mounting members 254, 255 and secured thereto via a frictional or snap fit therebetween. In embodiments, each indicator member 251, 252, 253 can be one indicator member from a respective set of indicator members, each with different indicia corresponding to a graphical code representing different values (or types) of a corresponding number of variable valve characteristics.

Each of the indicator members 251, 252, 253 illustrated in FIG. 7 has the same construction but with different indicia 261, 262, 263. Referring to FIG. 8, each indicator member 251 includes a head 275 and a peg 277 projecting from the head 275. The peg 277 is configured to be disposed within each one of the recesses 258.

In the illustrated embodiment, the head 275 and the peg 277 of each of the indicator members 251, 252, 253 each comprises a cylindrical shaft. In the depicted embodiment, the head 275 has a larger diameter than the peg 277. The indicia 261, 262, 263 are disposed over the entire external surface of the head 275 and the peg 277 of each of the indicator members 251, 252, 253, respectively. In other embodiments, the indicia 261, 262, 263 can be displayed only on the head 275 or a portion of the head 275. In embodiments, the indicator members 251, 252, 253 can be similar to the indicator members 51, 52 of FIGS. 3-6 in other respects.

Referring to FIGS. 9-11, another embodiment of a portion of a control valve 320 having a visual identification system 340 constructed according to principles of the present disclosure is shown. The visual identification system 340 includes a plurality of indicator members 351 (one being shown) in the form of a double-legged peg with each indicator member 351 having unique indicia 361 corresponding to a graphical code to indicate a respective specific value (or type) of multiple variable characteristics of the control valve 320. In the illustrated embodiment, the indicia 361 of the indicator member 351 comprise the color red. In other embodiments, different indicia can be used.

In embodiments, each indicator member 351 can be mounted to the control valve 320 by being fitted within any pair of a plurality of recesses in the form of bores 358, 359 defined within a pair of visual identifier mounting members 354, 355 and secured thereto via a frictional or snap fit therebetween. In embodiments, each indicator member 351 can be one indicator member from a respective set of indicator members, each with different indicia corresponding to a graphical code representing different values (or types) of a corresponding number of variable valve characteristics. Each indicator member 351 can have the same construction but with different indicia.

Referring to FIG. 8, each indicator member 351 includes a head 375 and first and second peg 377, 378 projecting from the head 375. The first and second pegs 377, 378 are in spaced relationship with respect to each other such that the first and second pegs 377, 378 of the indicator member 351 is configured to be respectively disposed within the first and second recesses 358, 359 together to mount one the indicator member 351 to the control valve 320.

In the illustrated embodiment, the head 375 and the pegs 377, 378 of the indicator member 351 each comprises a cylindrical shaft. In the depicted embodiment, the head 375 has a larger diameter than that of each of the pegs 377, 378. The indicia 361 are disposed over the entire external surface of the head 375 and the pegs 377, 378 of the indicator member 351. In other embodiments, the indicia 361 can be displayed only on the head 375 or a portion of the head 375. In embodiments, the indicator member 351 can be similar to the indicator members 51, 52 of FIGS. 3-6 and/or the indicator members 251, 252, 253 of FIGS. 7-9 in other respects.

Figure 12:
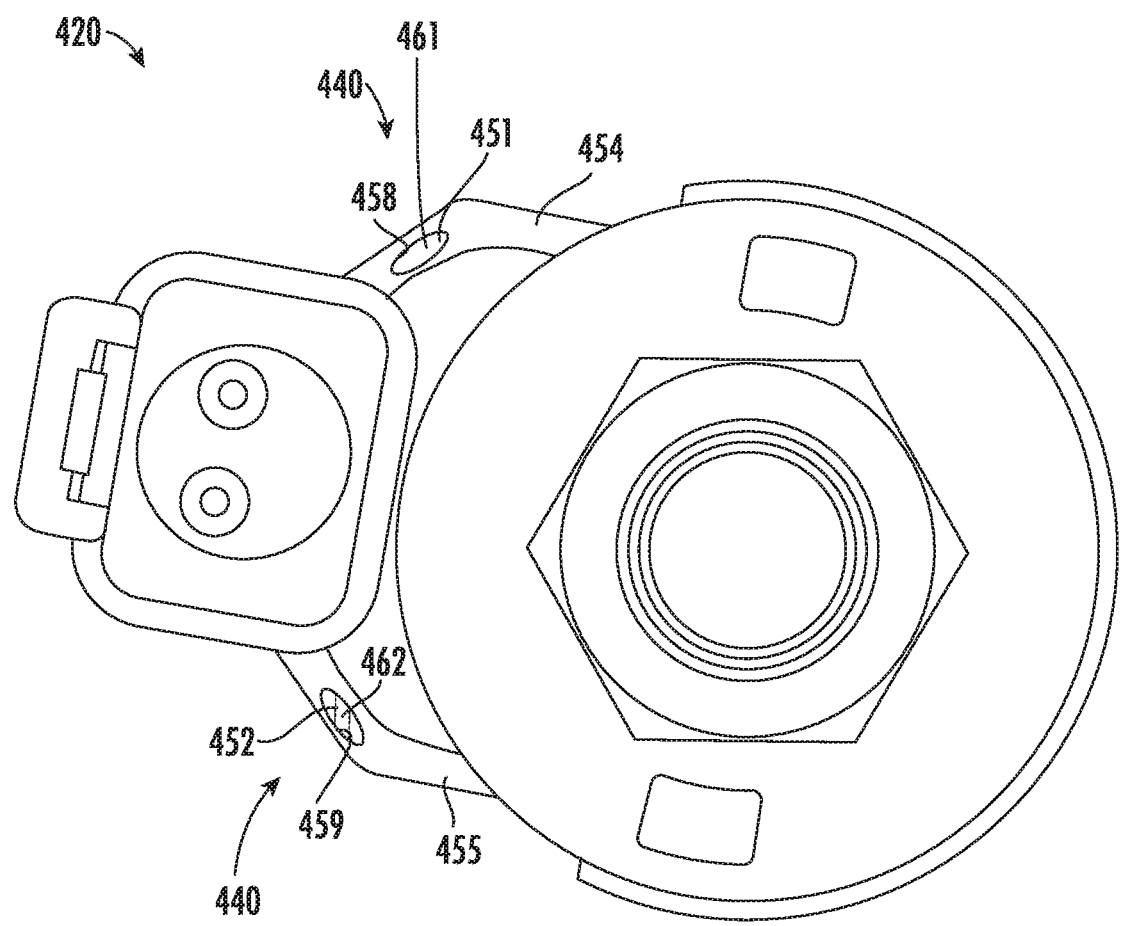
FIG. 12 is a top plan view of a portion of yet another embodiment of a solenoid coil for use in a hydraulic control valve constructed in accordance with principles of the present disclosure and of another embodiment of a visual identification system in accordance with principles of the present disclosure.

Referring to FIG. 12, another embodiment of a portion of a control valve 420 having a visual identification system 440 constructed according to principles of the present disclosure is shown. The visual identification system 440 includes a plurality of indicator members 451, 452 in the form of a hardenable material, such as, e.g., epoxy, with each indicator member 451, 452 having unique indicia 461, 462 corresponding to a graphical code to indicate a respective specific value (or type) of multiple variable characteristics of the control valve 420. In the illustrated embodiment, the indicia 461, 462 of the indicator members 451, 452 comprise the colors red and green, respectively. In other embodiments, different indicia can be used.

In embodiments, each indicator member 451, 452 can be mounted to the control valve 420 by being disposed within cavities 458, 459 defined within a pair of visual identifier mounting members 454, 455. The cavities 458, 459 can be in the form of recesses, reservoirs or blind bores configured to hold the indicator member 451, 452 in place as it transitions from a flowable material to a hardened object. In embodiments, each indicator member 451, 452 can be one indicator member from a respective set of indicator members, each with different indicia corresponding to a graphical code representing different values (or types) of a corresponding number of variable valve characteristics. Each of the indicator members 451, 451 can have the same construction but with different indicia.

In embodiments, one indicator member from each set of indicator members is selected for the control valve 420 that corresponds to the specific type (or value) that the control valve 420 is for the given variable characteristic. Each one of the set of indicator members is configured to be separately mounted in one of the cavities 58, 59 of the visual identifier mounting members 454, 455. More specifically, in embodiments, a selected colored, hardenable material that indicates a specific value of a variable characteristic corresponding to the value of that characteristic which the control valve 420 is can be directed into one of the reservoirs 458, 459 and then allowed to harden. In embodiments, the material adheres to the walls of the reservoir 458, 459 as it hardens to mount the selected indicator member 451, 452 in place.

In embodiments, the indicator member 451, 452 is mounted to the visual identifier mounting member 454, 455 by being inserted into the cavity 458, 459 in a liquid phase and being allowed to harden in situ. In embodiments, the indicator member 451, 452 comprises a colored epoxy corresponding to the indicia with which it is selected to bear.

Figure 13:
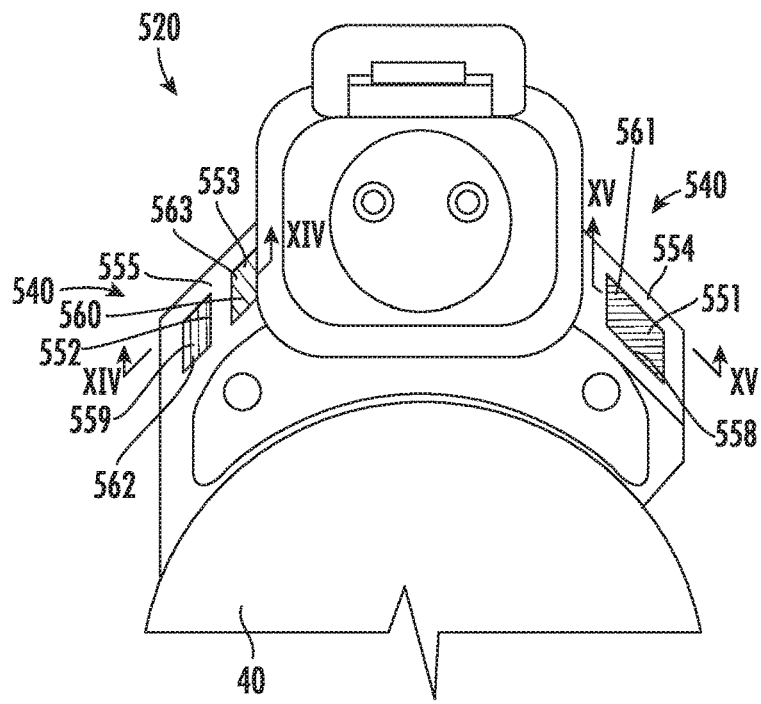
FIG. 13 is a partial, fragmentary top view of a portion of still another embodiment of a solenoid coil for use in a hydraulic control valve constructed in accordance with principles of the present disclosure and of another embodiment of a visual identification system in accordance with principles of the present disclosure.
Figure 14:
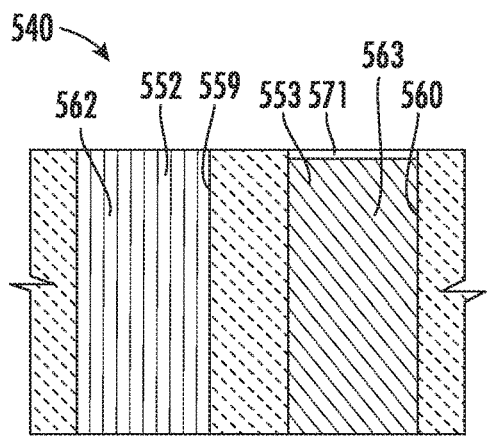
FIG. 14 is a cross-sectional view taken along line XIV-XIV in FIG. 13 of a pair of indicator members of the identification system of the portion of FIG. 13, the indicator members each comprising a hardenable material.
Figure 15:
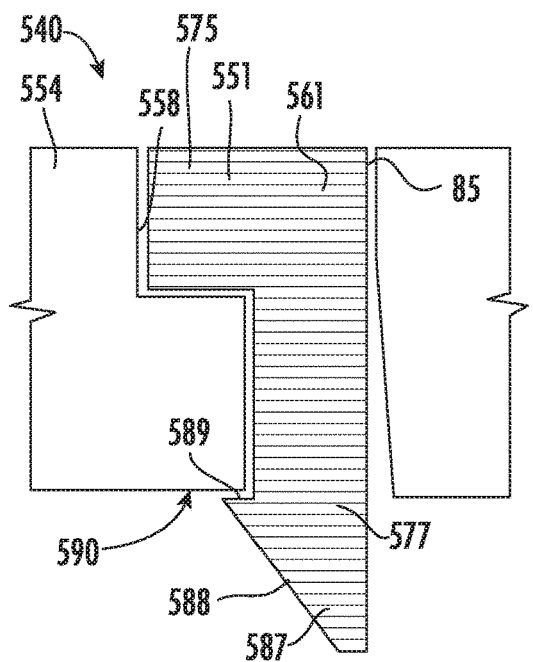
FIG. 15 is a cross-sectional view taken along line XV-XV in FIG. 13 of an indicator member in the form of a barbed retention finger of the identification system of the portion of FIG. 13.

Referring to FIGS. 13-15, another embodiment of a portion of a control valve 520 having a visual identification system 540 constructed according to principles of the present disclosure is shown. The visual identification system 540 includes a plurality of indicator members 551, 552, 553 with each indicator member 551, 552, 553 having unique indicia 561, 562, 563 corresponding to a graphical code to indicate a respective specific value (or type) of multiple variable characteristics of the control valve 520. The visual identification system 540 includes a combination of different types of indicator members 551, 552, 553 bearing the coded indicia. In the illustrated embodiment, the indicia 561, 562, 563 of the indicator members 551, 552, 553 comprise the colors blue, red, and green, respectively.

In embodiments, each indicator member 551, 552, 553 can be one indicator member from a respective set of indicator members, each with different indicia corresponding to a graphical code representing different values (or types) of a corresponding number of variable valve characteristics. For example, in embodiments, the first indicator member 551 designates which wiring harness connector should be attached to the control valve (which will have a similar color-coded blue indicia thereon), the second indicator member 552 designates the coil voltage of the control valve 520, and the third indicator member 553 designates whether the control valve 520 includes a diode therein. In other embodiments, different indicia can be used, and/or the color-coded indicia can indicate different variable characteristics based upon a predetermined graphical code.

In embodiments, each indicator member 551, 552, 553 can be mounted to the control valve 520 by being disposed within cavities 558, 559, 560 defined within a pair of visual identifier mounting members 554, 555. The cavities 558, 559 are in the form of reservoirs or blind bores configured to hold the indicator member 551, 552 within the respective cavity 558, 559. The cavity 560 is in the form of a through passage.

Referring to FIG. 14, the indicator member 552 having the red-colored indicia 562 comprises a colored, hardened material that has been inserted into the cavity 559 in a flowable condition and the allowed to harden in situ within the cavity 559, as discussed above in connection with the identification system 440 of FIG. 12. The indicator member 552 is adhered to the walls of the cavity 559 to mount the indicator member 552 to the visual identifier mounting members 555.

The indicator member 553 having the green-colored indicia 563 comprises a cylindrical-shaped member that is made using any suitable method and inserted into the cavity 560. A layer 571 of clear adhesive can be applied on top of the inserted material or member 553 to retain the material or member 553 in the cavity 560. The layer 571 is transparent so that the indicia 563 is visible therethrough.

Referring to FIG. 15, the indicator member 551 includes a head 575 and a peg 577 projecting from the head 575. The peg 577 is configured to be disposed within the recess 558.

The head 575 and the peg 577 of the indicator member are in the form of an L-shaped clip. The head 575 is generally rectangular, and the peg 577 is configured to be a locking leg that extends form the head 575. The peg 577 has a barbed terminal end 587 that has a tapered end portion 588 and a locking projection 589.

The tapered end portion 588 assists during insertion of the L-shaped clip 551 into the bore 558. The tapered end portion 588 bears against the bore 558 to help the indicator member 551 deform during its insertion through the bore 558.

The locking projection 589 locks under the arm 554 to secure the indicator member 551 to the arm 554. The arm or mounting member 554 includes a stop surface 590. The barbed terminal end 587 of the indicator member 551 is configured to retentively engage the stop surface 590 when the peg 577 is inserted in bore 558. Once fully inserted, the locking projection 589 interferingly engages the stop surface 590 to prevent the indicator member 551 from being withdrawn from the bore 558.

Through the use of a set of unique indicia, a visual identification system can be provided with each solenoid-actuated hydraulic control valve to improve the identification of the valves and simplify the assembly of the manifold. In embodiments, the indicator member can comprise a different component of the valve 20 which bears unique indicia designating a particular value for a variable characteristic, such as, for example, by color coding the housing of the electro-magnetic actuator 77, color coding a nut used with the solenoid coil 77, and/or color coding a washer or disc interposed between the nut and the solenoid coil 77. Each of these indicia can be applied (e.g., painted, marked with colored epoxy) to or on the specified component or be included as an insert. In addition, in embodiments, each of the components can include one or more indicia to perform any of the identification functions as described above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hydraulic control valve comprising:
   a control valve cartridge assembly, the control valve cartridge assembly including a movable member, the movable member being movable over a range of travel between a first flow position and a second flow position;
   an electro-magnetic actuator, the electro-magnetic actuator mounted to the control valve cartridge assembly and operatively associated with the movable member of the control valve cartridge assembly to selectively move the movable member from the first flow position to the second flow position;
   wherein at least one of the control valve cartridge assembly and the electro-magnetic actuator includes a visual identifier mounting member; and
   a visual identification system, the visual identification system including a first indicator member and a second indicator member, the first indicator member having an external surface bearing a first indicia, and the second indicator member having an external surface bearing a second indicia, the second indicia being different from the first indicia, the first and second indicator members each being configured to be separately removably mounted to the visual identifier mounting member via a mechanical connection without adhesive, wherein the first indicia and the second indicia comprise a predetermined graphical code configured to indicate a first value and a second value of a variable characteristic, respectively, the first value being different from the second value;
   wherein the first and second indicator members are each configured to be interengaged with the visual identifier mounting member via a retentive fit.

2. The hydraulic control valve according to claim 1, wherein the first and second indicator members each comprise a U-shaped clip having a pair of legs with a connecting portion extending therebetween, the U-shaped clip configured to be interengaged with the visual identifier mounting member such that a portion of the visual identifier mounting member is interposed between the pair of legs and frictionally engaged therewith.

3. The hydraulic control valve according to claim 1, wherein the visual identifier mounting member defines a recess, and the first and second indicator members each includes a head and a peg projecting from the head, the peg configured to be disposed within the recess.

4. The hydraulic control valve according to claim 3, wherein the peg of each of the first and second indicator members comprises a cylindrical shaft.

5. The hydraulic control valve according to claim 4, wherein the first and second indicia are disposed on the head of the first and second indicator members, respectively.

6. The hydraulic control valve according to claim 3, wherein the peg of each of the first and second indicator members includes a barbed terminal end, and the mounting member includes a stop surface, the barbed terminal end of the first and second indicator members each being configured to retentively engage the stop surface when the peg is inserted in recess.

7. The hydraulic control valve according to claim 3, wherein the recess comprises a first recess and the peg of the first and second indicator members each comprises a first peg, and wherein the visual identifier mounting member defines a second recess, and the first and second indicator members each includes a second peg projecting from the head, the second peg in spaced relationship with the first peg such that the first and second pegs of each of the first and second indicator members are configured to be disposed within the first and second recesses together to mount one of the first and second indicator members.

8. The hydraulic control valve according to claim 1, wherein the electro-magnetic actuator includes a hollow tube, a coil mounted to the tube, a movable armature disposed within the tube, and a pole piece disposed within the tube, the tube being connected to the control valve cartridge assembly.

9. The hydraulic control valve according to claim 8, wherein the variable characteristic comprises one of a coil voltage, a coil type, an electrical connector type, a diode type, and a mounting location.

10. The hydraulic control valve according to claim 1,
wherein the variable characteristic comprises a first variable characteristic,
wherein the visual identification system includes a third indicator member and a fourth indicator member, the third indicator member having an external surface bearing a third indicia, and the fourth indicator member having an external surface bearing a fourth indicia, the third indicia being different from the first indicia, the second indicia, and the fourth indicia, and the fourth indicia being different from the first indicia, the second indicia, and the third indicia, the third and fourth indicator members each being configured to be separately removably mounted to at least one of the control valve cartridge assembly and the electro-magnetic actuator in a location different from a mounting location of one of the first indicator member and the second indicator member on the visual identifier mounting member, and
wherein the third indicia and the fourth indicia comprise a part of the predetermined graphical code configured to indicate a third value and a fourth value of a second variable characteristic, respectively, the third value being different from the fourth value, and the second variable characteristic being different from the first variable characteristic.

11. The hydraulic control valve according to claim 10, wherein the visual identifier mounting member comprises a first visual identifier mounting member, and wherein at least one of the control valve cartridge assembly and the electro-magnetic actuator includes a second visual identifier mounting member, the third and fourth indicator members each being configured to be separately removably mounted to the second visual identifier mounting member.

12. The hydraulic control valve according to claim 11, wherein the third and fourth indicator members are each configured to be separately removably mounted to the second visual identifier mounting member via a mechanical connection substantially without adhesive.

13. The hydraulic control valve according to claim 10, wherein the third and fourth indicator members are each configured to be separately removably mounted to said at least one of the control valve cartridge assembly and the electro-magnetic actuator via a mechanical connection substantially without adhesive.

14. A hydraulic control valve comprising:
a control valve cartridge assembly, the control valve cartridge assembly including a movable member, the movable member being movable over a range of travel between a first flow position and a second flow position;
an electro-magnetic actuator, the electro-magnetic actuator mounted to the control valve cartridge assembly and operatively associated with the movable member of the control valve cartridge assembly to selectively move the movable member from the first flow position to the second flow position;
wherein at least one of the control valve cartridge assembly and the electro-magnetic actuator includes a visual identifier mounting member, the visual identifier mounting member defining a cavity; and
a visual identification system, the visual identification system including a first indicator member and a second indicator member, the first indicator member having an external surface bearing a first color, and the second indicator member having an external surface bearing a second color, the second color being different from the first color, the first and second indicator members each being configured to be separately disposed in the cavity of the visual identifier mounting member, wherein the first indicia and the second indicia comprise a predetermined color code configured to indicate a first value and a second value of a variable characteristic, respectively, the first value being different from the second value;
wherein the cavity of the visual identifier mounting member comprises a bore configured to hold, separately, the first and second indicator members therewithin.

15. The hydraulic control valve according to claim 14, wherein the first indicator member and the second indicator member each comprises a hardenable material, and wherein the cavity of the visual identifier mounting member comprises a blind bore.

16. The hydraulic control valve according to claim 15, wherein one of the first indicator member and the second indicator member is disposed within the cavity, said one of the first indicator member and the second indicator member being mounted to the visual identifier mounting member by being inserted into the cavity in a liquid phase and being allowed to harden in situ.

17. The hydraulic control valve according to claim 16, wherein said one of the first indicator member and the second indicator member comprises the first indicator member, and the first indicator member comprises an epoxy, the epoxy being the first color.

18. The hydraulic control valve according to claim 14, wherein one of the first indicator member and the second indicator member is disposed within the cavity, and the visual identification system includes a layer of clear adhesive applied on top of the inserted one of the first indicator member and the second indicator member to retain said one of the first indicator member and the second indicator member in the cavity.

19. The hydraulic control valve according to claim 14, wherein the visual identifier mounting member and the cavity comprise a first visual identifier mounting member and a first cavity, respectively, wherein at least one of the control valve cartridge assembly and the electro-magnetic actuator includes a second visual identifier mounting member, the second visual identifier mounting member defining a second cavity, wherein the variable characteristic comprises a first variable characteristic, and wherein the visual identification system includes a third indicator member and a fourth indicator member, the third indicator member having an external surface bearing a third color, and the fourth indicator member having an external surface bearing a fourth color, the third color being different from the first color, the second color, and the fourth color, and the fourth color being different from the first color, the second color, and the third color, the third and fourth indicator members each being configured to be separately removably mounted in the second cavity, wherein the third color and the fourth color comprise a part of the predetermined graphical code configured to indicate a third value and a fourth value of a second variable characteristic, respectively, the third value being different from the fourth value, and the second variable characteristic being different from the first variable characteristic.

\* \* \* \* \*